July 23, 1940.   A. B. NEWTON   2,209,101
REFRIGERATION SYSTEM
Filed May 5, 1938   2 Sheets-Sheet 1

Inventor
Alwin B. Newton
By
George H Fisher
Attorney

Patented July 23, 1940

2,209,101

UNITED STATES PATENT OFFICE 2,209,101

REFRIGERATION SYSTEM

Alwin B. Newton, Minneapolis, Minn., assignor to Minneapolis-Honeywell Regulator Company, Minneapolis, Minn., a corporation of Delaware Application May 5, 1938, Serial No. 206,160

10 Claims. (Cl. 62—8)

This invention relates to expansion valves for use in refrigeration systems and more particularly to a thermostatic expansion valve of the type which is operated in response to variations in superheat at the outlet of the evaporator.

It is common to control expansion valves for refrigeration systems in accordance with the pressure on the suction side of the system and also in accordance with the temperature of the refrigerant leaving the evaporator by providing a pressure responsive device which is exposed on one side to the suction pressure in the system and which is exposed on the opposite side to a pressure which corresponds to the temperature of the refrigerant at the evaporator outlet. Means are usually provided to bias the valve towards closed position, and the pressure responsive device acts to move the valve towards open position upon an increase in temperature of the refrigerant at the evaporator outlet and to move the valve towards closed position upon an increase in pressure on the suction side of the system.

It is a characteristic of all known refrigerants, that as the temperature of the refrigerant increases the pressure corresponding to the temperature increases at a greater rate, so that the pressure exerted on the pressure responsive device tending to open the valve in response to an increase in temperature at the outlet of the evaporator will not vary in a straight line relationship with the temperature. The result of this is that the superheat existing at the evaporator outlet will vary in accordance with variations in temperature of the refrigerant at the evaporator outlet. As the superheat at the evaporator outlet increases, the effective cooling area of the evaporator decreases, and it is desirable to utilize as much of the evaporator at all times as is possible for cooling, in order that the system may operate at maximum efficiency. In order to do this, the superheat maintained at the evaporator outlet must be kept substantially constant at all times.

In accordance with my invention, this may be done by decreasing the effective area of the side of the pressure responsive means which is exposed to the pressure corresponding to the temperature of the refrigerant at the outlet of the evaporator by an amount which is sufficient to compensate for the deviation of the temperature pressure curve of the refrigerant from a straight line relationship.

It is therefore an object of this invention to provide a thermostatic expansion valve for use in a refrigeration system, constructed in a novel manner so as to maintain substantially uniform conditions of superheat at the evaporator outlet regardless of the temperature or pressure of the refrigerant at the outlet.

Other objects will become apparent upon examination of the specification, claims and appended drawings, in which:

Figure 1:
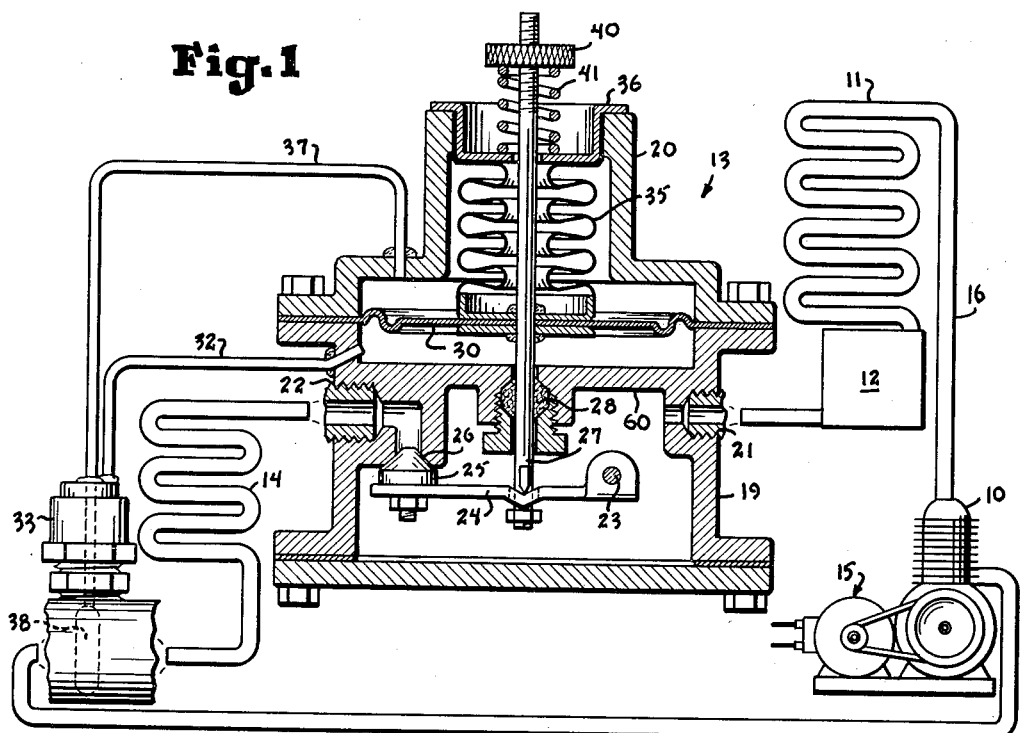
Figure 1 is a cross sectional view of one form of expansion valve embodying my invention operatively connected to a refrigeration system.

Referring more particularly to Figure 1, a refrigeration system embodying a compressor 10 and condenser 11, a receiver 12, expansion valve 13, and an evaporator 14 is illustrated. The compressor 10 is driven by a motor 15 which may be controlled in any suitable conventional manner. The refrigerant compressed by the compressor 10 flows through the pipe 16 to the condenser 11 where it is condensed and flows into the receiver 12. The condensed refrigerant then flows through the expansion valve 13 where the pressure thereof is reduced, into the evaporator 14 where it is evaporated by absorbing heat from the surrounding medium being cooled, the refrigerant then returning to the inlet of the compressor 10.

The expansion valve comprises a valve casing 19 and a casing 20 housing the operating mechanism for the valve member. The valve casing 19 includes an inlet 21 to which the pipe leading from the receiver 12 is connected and an outlet 22 which is connected to the inlet of the evaporator. Pivotally mounted at 23 in the casing 19 is a lever 24 carrying at its outer end a valve element 25 which cooperates with a valve seat 26 for controlling the flow of refrigerant from the receiver to the evaporator. Suitably connected to an intermediate portion of the lever 24 is a rod 27 which passes through the upper wall 60 of the casing 19, there being a suitable sealing means 28 for preventing escape of refrigerant around the rod 27.

The intermediate portion of the rod 27 is suitably connected to a diaphragm 30, this diaphragm in turn being connected between the casings 19 and 20 as illustrated. A chamber is formed between the underside of the diaphragm 30 and the upper wall of the casing 19 and this space is connected by means of a tube 32 to the outlet of the evaporator by means of a fitting 33. This fitting may be of any suitable construction and may be formed as illustrated in Figure 9 of my copending application Serial No. 192,818 filed Feb. 26, 1938.

To the upper portion of the diaphragm 30 is suitably connected a bellows 35, this bellows being sealed to the diaphragm and being connected to a cup-shaped member 36 which is in turn suitably held in fluid tight engagement with the upper portion of the casing 20. A space is thus formed between the casing 20, diaphragm 30, and the bellows 35, and is sealed from the atmosphere. This space is connected by means of a capillary tube 37 to a bulb 38 which is mounted within the outlet of the evaporator 14, this tube, bulb, and the aforementioned space formed by casing 20, diaphragm 30, and bellows 35 being filled with a suitable volatile fluid. The upper portion of the rod 27 is threaded and receives a nut 40, there being a compression spring held between the nut 40 and the bottom of the cup member 36. This spring serves to bias the rod 27 upwardly and thus biases the valve member 25 into seating engagement with the valve seat 26. The upper and lower portions of the diaphragm 30 are subjected to varying pressures. The under side of the diaphragm 30 is subjected to the pressure of the refrigerant at the outlet of the evaporator and the upper side of the diaphragm is subjected to a pressure corresponding to the temperature of the refrigerant at the evaporator outlet since the bulb 38 is subjected to the temperature of the refrigerant leaving the evaporator. Accordingly variations in the superheat of the refrigerant leaving the evaporator will cause different pressures to be exerted on the diaphragm 30 and since this diaphragm is operatively connected to the valve element 25 by means of the rod 27 and lever 24, the valve 25 will move in response to variations in superheat at the outlet of the evaporator. The operation of the valve may be readily observed by observing the motion of that portion of rod 27 which extends outside the valve casing.

The bellows 35 has the effect of reducing the area of the diaphragm 30 which is subjected to the pressure exerted by the bulb 38 and this bellows will be of a proper size to insure that for a given setting of the spring 41 that the valve 25 will operate to maintain a substantially uniform degree of superheat at the evaporator outlet irrespective of variations in temperature or pressure at the outlet. In other words this bellows will reduce the effective area of the upper portion of the diaphragm 30 an amount which is sufficient to compensate for the deviation of the temperature pressure curve of the particular refrigerant which is used in the system from a straight line.

Figure 3:
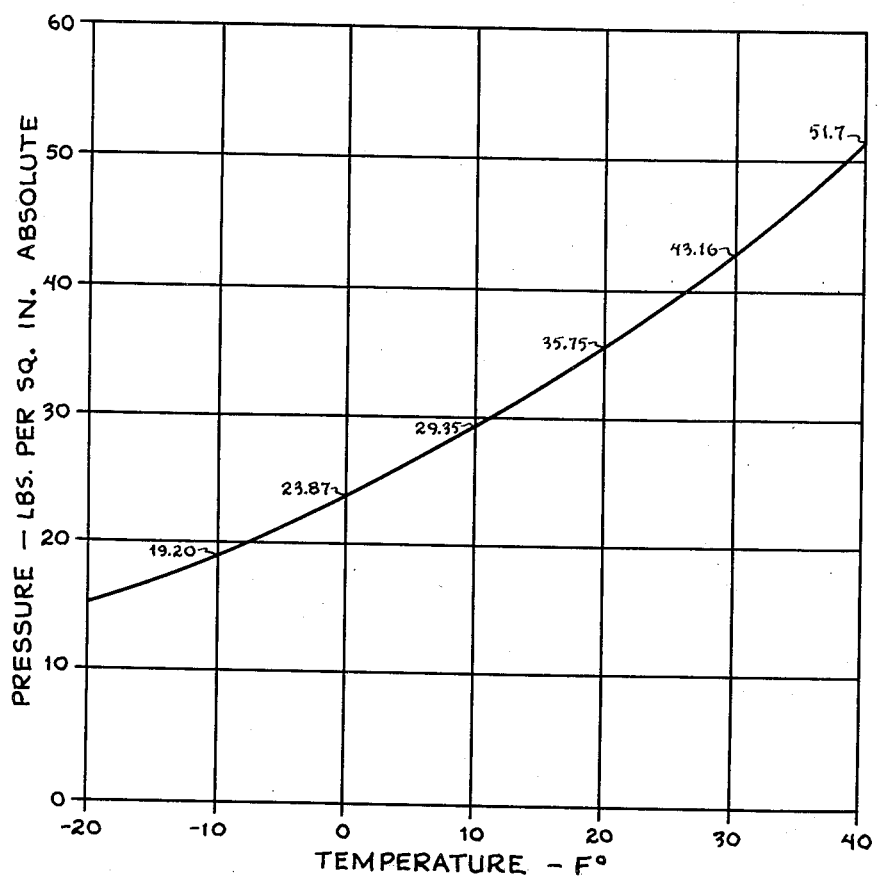
Figure 3 is a pressure temperature curve of the refrigerant known as Freon or F-12.

For a more complete explanation of the theory as to why this arrangement maintains a constant superheat of the refrigerant leaving the evaporator, reference is made to Figure 3 showing a pressure temperature curve of the refrigerant known as Freon or F-12. The following explanation is made with reference to this particular refrigerant but since all known refrigerants have a saturation curve which has generally the same characteristics of the curve shown in Figure 3, this explanation will be applicable to any known type of refrigerant.

If it be assumed first that the bellows 35 of Figure 1 be omitted and the chamber above the diaphragm sealed from the atmosphere, the diaphragm will have the same area exposed to the pressure of the refrigerant as the other side which is exposed to a pressure corresponding to the temperature of the refrigerant leaving the evaporator. Let is be assumed that the area of the diaphragm being so exposed to these pressures is 1.5 sq. in. If it be desired that the valve maintain a superheat of 10° when the pressure at the evaporator outlet is 23.87 lbs. per sq. in. which corresponds to 0° F. there will be a pressure exerted by the refrigerant on the underside of the diaphragm 30 of 23.87 times the diaphragm area of 1.5 sq. in. or 35.8 lbs. tending to close the valve. The pressure exerted on the upper side of the diaphragm, if the refrigerant is to be superheated 10° will be 29.35 lbs. per sq. in. as will be noted with reference to Figure 3. The force tending to open the valve will be therefore 29.35 times the diaphragm area or 44.02 lbs. In order to balance the pressures at this time the spring 41 must exert a force tending to close the valve which force will be equal to the difference in the pressures exerted on opposite sides of the diaphragm, or a force of approximately 8.2 lbs.

Assume now that the pressure of the refrigerant leaving the evaporator has risen to 35.75 lbs. per sq. in. corresponding to a saturation temperature of 20° F. The force acting on the underside of the diaphragm will now be 35.75 times the bellows area or 53.62 lbs. The total force tending to close the valve at this time will be 53.62 lbs. plus the force exerted by the spring 41 of 8.2 lbs. or 61.82 lbs. The force which must be exerted on the upper side of the diaphragm at this time must be equal therefore to 61.82 lbs. which is the total force acting to close the valve and this force divided by the diaphragm area is equal to 41.21 lbs. per sq. in. The temperature corresponding to 41.21 lbs. per sq. in. is approximately 28° F. so that the superheat has now dropped from 10° to approximately 8°. Likewise if the pressure of the refrigerant at the evaporator outlet further increases the superheat being maintained will drop still further and should the pressure drop below 23.87 lbs. per sq. in. the superheat which is maintained will increase above the 10° value. The fact that the relationship between pressure and temperature is not a straight line accounts for this variation in the superheat and it will thus be understood that with the conventional arrangement wherein the areas that are exposed to the refrigerant pressure and the pressure corresponding to the temperature of the refrigerant leaving the outlet are the same, that the superheat which is maintained by the valve will necessarily vary as the temperature and pressure of the refrigerant at the evaporator outlet varies.

With the arrangement shown in Figure 1 the presence of the bellows 35 renders the area on the diaphragm which is exposed to the pressure corresponding to the temperature of the refrigerant at the outlet less than the area on the underside of the diaphragm which responds to the suction pressure. Assume that the area on the underside of the diaphragm exposed to the suction pressure is 1.54 sq. in., and assume also that the area of the bellows 35 is .25 sq. in. The difference between these areas is 1.29 sq. in. and represents the area of the diaphragm which is exposed to the pressure within the bulb 38. At 23.87 lbs. per sq. in. corresponding to 0° F. the force exerted on the underside of the diaphragm tending to close the valve will be equal to 23.87 times the bellows area or 36.76 lbs. If the valve is to maintain a superheat of 10° there will be a force of 29.35 lbs. per sq. in. acting downwardly on the upper side of the diaphragm or a total force of 29.35 times the area of the diaphragm which is exposed to this pressure or 1.29, giving a total force of 37.86 lbs. Since the interior of the bellows 35 is exposed to atmospheric pressure and taking this pressure as 14.7 lbs. per sq. in. there will be an additional force tending to open the valve of 14.7 times the area of the bellows 35 or a total force of 3.67 lbs. Accordingly the total force acting downwardly on the diaphragm to open the valve will be equal to the sum of these forces or approximately 41.53 lbs. In order to balance the forces acting on the two sides of the diaphragm at this time the spring 41 must exert a force equal to the difference of these forces, or a force of 4.77 lbs. Since the force which is exerted by atmospheric pressure does not vary, 3.67 lbs. must always be exerted by the spring 41 to balance the atmospheric pressure so that if this pressure be neglected from further computations in order to simplify the same, the spring 41 may be considered as exerting a force equal to the total force actually exerted by the spring minus that portion of the force necessary to balance the atmospheric pressure, or a net force of 1.1 lbs.

Assume now that the pressure at the evaporator outlet is 35.75 lbs. per sq. in. corresponding to a temperature of 20 F. the force exerted on the underside of the diaphragh tending to close the valve will be 35.75 times the diaphragm area or 55.05 lbs. Adding to this the spring pressure of 1.1 lbs. tending to close the valve there will be a total closing force of 56.15 lbs.

In order to balance the pressures, the bulb 38 must exert a force downwardly of 56.15 divided by the area of the diaphragm 30 exposed to this pressure, or 1.29 sq. in. giving a force of 43.56 lbs. per sq. in. exerted by the bulb 38 which corresponds to approximately 30° F. It will thus be seen that the superheat which the valve maintains at this time is still approximately 10°. Should the pressure at the evaporator outlet drop to 19.20 lbs. per sq. in. corresponding to −10° F. the force acting upwardly on the diaphragm will be 29.57 lbs. which added to the spring pressure of 1.1 lbs. gives a total closing force of 30.67 lbs. To balance this pressure the bulb must exert a force of 30.67 divided by 1.29 or a force of 23.72 lbs. per sq. in. which corresponds to approximately 0° F. so that the expansion valve is still capable of maintaining a superheat at the evaporator outlet of approximately 10° F.

It will thus be understood that by properly proportioning the areas of the diaphragm which are subjected to the pressure at the evaporator outlet and the pressure which corresponds to the temperature of the refrigerant leaving the evaporator and by properly sizing the spring 41, the characteristics of the pressure temperature curve of the particular refrigerant employed may be compensated for so that the valve will act to maintain the superheat at the evaporator outlet at a substantially constant value regardless of the actual pressure or temperature of the refrigerant at the outlet of the evaporator.

Should it be desirable to vary the effective cooling area of the evaporator 14, it is only necessary to adjust the position of the nut 40 with respect to the rod 27, this adjustment being rendered simple since the rod 27 extends outside of the valve casing, thus varying the force exerted by the spring 31 which will cause a different degree of superheat to be maintained at the evaporator outlet for a given temperature and pressure. It should be understood however that for a given size of the bellows 35 and a given refrigerant there is only one setting of the spring 41 that will maintain a uniform degree of superheat at the evaporator outlet for different pressures and temperatures at the outlet, and adjustment of the spring 41 will result in fluctuations of the superheat at the evaporator outlet for varying temperatures and pressures. The amount that the degree of superheat will vary will depend upon the amount that the spring 41 is adjusted from its desired setting, but it should be understood that this variation will be less than would occur were bellows 35 omitted.

Figure 2:
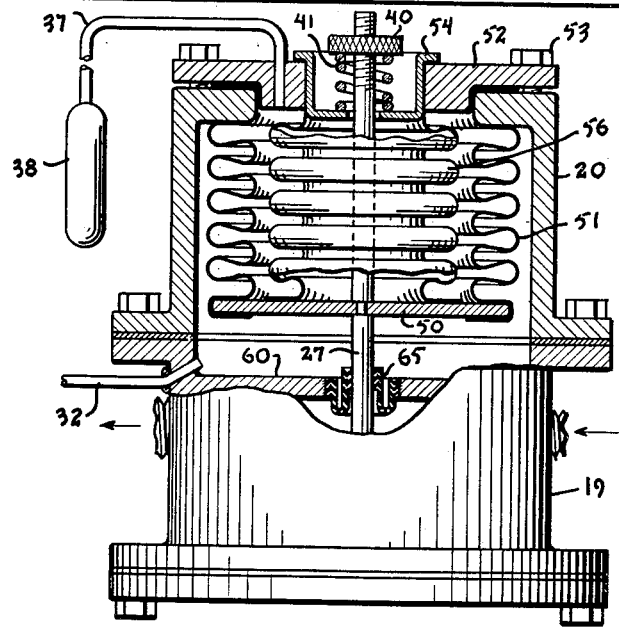
Figure 2 is a view in partial cross section of a modification of the expansion valves shown in Figure 1.

Referring now to the modification illustrated in Figure 2, the valve chamber 19 is substantially the same as that of Figure 1, the valve elements being arranged in the same manner. The operating mechanism for the valve differs however from that shown in Figure 1. In place of the diaphragm 30 of Figure 1, a rigid plate 50 is suitably connected to the operating rod 27 and the lower end of a bellows 51 is sealed to this plate member, the upper end of this bellows being suitably sealed between the casing 20 and the plate member 52 forming the upper wall of the casing 20 or in any other suitable manner. This plate member may be secured to the casing 20 in any suitable manner and bolts 53 have been illustrated for that purpose. The plate 52 is apertured at its center and a cup-shaped member 54 similar to the cup-shaped member 36 is suitably secured at its upper end. Between the plate member 52 and the cup-shaped member 54 is a bellows 56 concentrically arranged with respect to the bellows 51, this bellows being suitably secured at its lower end to the plate 50. The underside of the plate 50 is connected by means of the pipe 32 to the evaporator outlet and that portion of the upper portion of the plate 50 between the bellows 51 and 56 is connected by means of the capillary tube 37 which extends through the plate 52 to the bulb 38 which may be mounted in the evaporator outlet as in Figure 1. The space between the two bellows 51 and 56, the tube 37, and the bulb 38 are filled with a suitable volatile fluid which may be the same as the refrigerant being used in the system and it will therefore be apparent that the plate member 50 and accordingly the operating rod 27 will move in accordance with the pressure of the refrigerant at the evaporator outlet and also in accordance with the temperature of the refrigerant at the evaporator outlet. The bellows 56 reduces the area of the plate 50 which is subjected to the pressure corresponding to the temperature of the refrigerant at the evaporator outlet and if this bellows is of the proper size for the particular refrigerant and the particular setting of the spring 41 it will be apparent that plate member 50 will cause the operation of the valve element so as to maintain a constant degree of superheat at the evaporator outlet in the same way as the valve of Figure 1.

In place of the sealing means 28 of Figure 1 between the rod 27 and the upper wall 60 of casing 19, seal 65 of rubber or similar material has been illustrated as connecting the rod 27 and the plate 60. This rubber seal may be of thin rubber, connected to the rod and plate by electro-depositing a thin layer of rubber to the rod and plate, and vulcanizing the rubber or like member 65 thereto. This member 65 positively prevents the flow of refrigerant through wall 60 around the rod 27 without restraining the movement of the rod. It should be understood of course that the same sealing means may be used in the valve mechanism of Figure 1, and conversely, the sealing means of Figure 1 might be used in the valve mechanism of Figure 2.

While bellows operated valves have many advantages over diaphragm operated expansion valves, one of the disadvantages of the bellows operated valve in the past has been the tendency of the bellows to rupture after extended use. This has been caused mainly by the fact that in prior valve constructions the operating bellows has been exposed on one side to atmospheric conditions. It will be noted that in the valve of Figure 2 the bellows 56 is exposed on both sides thereof to refrigerant and it is impossible for any moisture to come in contact with the bellows 51, thus removing the chief cause of rupture of the bellows. The bellows 56, besides reducing the effective area of the upper portion of the plate 50 also serves as a sealing bellows for the rod 27. By reason of this arrangement, should the operating bellows 56 for any reason become ruptured, there will be no loss of refrigerant from the system by reason of the sealing bellows 56. The valve however would not work properly in such a case so that the valve would be ordinarily repaired before the sealing bellows 56 also ruptured and permitting loss of refrigerant from the system. If the sealing bellows 56 on the other hand should become ruptured, the only refrigerant that would be lost would be the relatively small amount which is included in the bulb 38, the tube 37, and the bellows 51. It will thus be seen that by reason of the arrangement of the bellows, danger of rupture thereof is reduced to a minimum and even in case of rupture of either one thereof the loss of refrigerant is eliminated.

It will thus be seen that I have devised an expansion valve which is of relatively simple construction while at the same time controlling the flow of refrigerant to the evaporator in such a manner that a substantially uniform degree of superheat at the outlet thereof is maintained regardless of the particular pressure or temperature of the refrigerant at the outlet, thus insuring that the effective area of the evaporator will be maintained at all times and assuring maximum efficiency of the refrigeration system.

While I have illustrated two specific forms of my invention, many modifications thereof may become apparent to those skilled in the art and it should be understood that my invention is to be limited only by the scope of the appended claims.

I claim as my invention:

1. In a refrigeration system including a condenser and an evaporator, a valve for controlling the flow of refrigerant from the condenser to the evaporator, operating means for controlling the position of said valve, said operating means including a plate member movable in response to variations in pressure differential of the opposite sides thereof, means exposing one side of said plate member to the pressure existing on the low pressure side of the refrigeration system, and means exposing a smaller portion of the other side of said plate member to the pressure corresponding to the temperature of the refrigerant on the low pressure side of the system, the relative areas on the two sides of the plate member which are exposed to the two different pressures being so proportioned that the refrigerant will be maintained at a substantially constant degree of superheat at the evaporator outlet for varying temperatures and pressures of the refrigerant.

2. In a refrigeration system including a condenser and an evaporator, a valve for controlling the flow of refrigerant from the condenser to the evaporator, said valve including a valve housing having a valve chamber and an operating chamber, said valve chamber enclosing a valve seat and a cooperating valve member, a flexible diaphragm separating said operating chamber into separate compartments, means causing said valve member to move in accordance with movements of said diaphragm, means providing communication between one of said compartments and the suction side of the refrigeration system, means subjecting the other of said compartments to a pressure corresponding to the temperature of the refrigerant at the evaporator outlet, and means for rendering the area of the diaphragm exposed to the last named pressure less than the area exposed to the pressure on the suction side of the refrigeration system, by such an amount that the valve member will operate to maintain a substantially constant degree of superheat at the evaporator outlet for varying temperatures and pressures of the refrigerant.

3. In a refrigeration system including a condenser and an evaporator, a valve for controlling the flow of refrigerant from the condenser to the evaporator, said valve including a valve housing having a valve chamber and an operating chamber, said valve chamber enclosing a valve seat and a cooperating valve member, a flexible diaphragm separating said operating chamber into separate compartments, means causing said valve member to move in accordance with movements of said diaphragm, means providing communication between one of said compartments and the outlet of the evaporator, a bellows sealed to the opposite side of said diaphragm and to a wall of the other of said compartments opposite said diaphragm, and means exposing the space surrounding said bellows in said other compartment to a pressure corresponding to the temperature of the refrigerant at the evaporator outlet, said bellows being of such a size that the valve is moved by the diaphragm in a manner to maintain a substantially constant degree of superheat at the evaporator outlet.

4. In a refrigeration system including a condenser and an evaporator, a valve for controlling the flow of refrigerant from the condenser to the evaporator, said valve including a valve seat and a valve member cooperating therewith, operating mechanism for controlling the position of said valve member, said operating mechanism including a pair of concentric bellows arranged one inside the other, means exposing the exterior of the outer bellows to the pressure of the refrigerant in the suction side of the refrigeration system, and means exposing the exterior of the inner bellows to a pressure corresponding to the temperature of the refrigerant at the evaporator outlet.

5. In a refrigeration system including a condenser and an evaporator, a valve for controlling the flow of refrigerant from the condenser to the evaporator, said valve including a valve seat and a valve member cooperating therewith, operating mechanism for controlling the position of said valve member, said operating mechanism including a pair of concentric bellows arranged one inside the other, a movable wall member sealed to a pair of adjacent ends of said bellows, means fixedly securing the opposite end of said bellows and sealing the space surrounding the outer wall portion of the inner bellows from the atmosphere, means exposing the exterior of said outer bellows to the pressure in the suction side of the refrigeration system, means exposing the exterior of the inner bellows to the pressure corresponding to the temperature of the refrigerant at the outlet of the evaporator, and means for causing operation of said valve member in accordance with movements of said movable wall member.

6. In a refrigeration system including a condenser and an evaporator, a valve for controlling the flow of refrigerant from the condenser to the evaporator, said valve including a valve seat and a valve member cooperating therewith, operating mechanism for controlling the position of said valve member, said operating mechanism including a pair of concentric bellows arranged one inside the other, a movable wall member sealed to a pair of adjacent ends of said bellows, means fixedly securing the opposite end of said bellows and sealing the space surrounding the outer wall portion of the inner bellows from the atmosphere, means exposing the exterior of said outer bellows to the pressure of the refrigerant at the evaporator outlet, means exposing the exterior of the inner bellows to the pressure corresponding to the temperature of the refrigerant at the evaporator outlet, means operatively connecting the plate member to the valve member, the areas of the two bellows being so proportioned that the valve member is controlled to maintain a substantially constant degree of superheat at the evaporator outlet.

7. In a refrigeration system including a condenser and an evaporator, valve means for controlling the flow of refrigerant from the condenser to the evaporator, said valve means including a valve housing divided into a valve chamber and an operating chamber, said valve chamber including inlet and outlet ports and a valve member controlling the flow of refrigerant from the inlet to the outlet port, a movable plate member in the operating chamber operatively connected to said valve member, a pair of spaced concentric bellows each having an end thereof sealed to said plate member, the other end of each of said bellows being sealed to a wall of said operating chamber, means subjecting the space in said operating chamber surrounding said outer bellows to the pressure of the refrigerant at the evaporator outlet, means subjecting the exterior of the inner bellows to the pressure corresponding to the temperature of the refrigerant at the evaporator outlet, the area of said bellows being so proportioned that the valve maintains substantially constant superheat at the evaporator outlet for varying pressures at the outlet.

8. In a refrigeration system including a condenser and an evaporator, valve means for controlling the flow of refrigerant from the condenser to the evaporator, a member movable in response to variations in pressure differential on the opposite sides thereof operatively connected to said valve means, means biasing said member in a direction to cause said valve means to be moved toward closed position, means exposing one side of said member to the pressure of the refrigerant at the evaporator outlet, means exposing the other side of said member to a pressure corresponding to the temperature of the refrigerant at the evaporator outlet, and means connected to said other side of said member for reducing the area thereof which is exposed to the pressure corresponding to the temperature of the refrigerant by an amount sufficient to cause said member to operate the valve to maintain a substantially constant degree of superheat at the evaporator outlet, regardless of the pressure and temperature of the refrigerant.

9. In a refrigeration system including a condenser and an evaporator, a valve for controlling the flow of refrigerant from the condenser to the evaporator, said valve including a casing separated by a wall into a pair of chambers, one of said chambers including an inlet and an outlet, a valve member for controlling the flow of refrigerant from the inlet to the outlet, operating mechanism in said other chamber for controlling the position of said valve member, said operating mechanism including a plate member movable in response to variations in pressure differential of the opposite sides thereof, means exposing one side of said plate member to the pressure existing on the low pressure side of the refrigeration system, means exposing the other side of said plate member to the pressure corresponding to the temperature of the refrigerant at the outlet of the evaporator, and means for rendering the area of said other side of the plate member which is exposed to the aforementioned pressure less than the area of said one side of the plate member which is exposed to the pressure on the low pressure side of the system, the inlet and outlet in said one of said chambers being so arranged that said wall is exposed on one side to warm refrigerant.

10. In a refrigeration system including a condenser and an evaporator, a valve for controlling the flow of refrigerant from the condenser to the evaporator, said valve including a casing separated by a wall into a pair of chambers, one of said chambers including an inlet and an outlet, a valve member for controlling the flow of refrigerant from the inlet to the outlet, operating mechanism in said other chamber for controlling the position of said valve member, said operating mechanism including a plate member movable in response to variations in pressure differential of the opposite sides thereof, means exposing one side of said plate member to the pressure existing on the low pressure side of the refrigeration system, means exposing the other side of said plate member to the pressure corresponding to the temperature of the refrigerant at the outlet of the evaporator, means for rendering the area of said other side of the plate member which is exposed to the aforementioned pressure less than the area of said one side of the plate member which is exposed to the pressure on the low pressure side of the system, means extending through said wall for connecting said operating mechanism and said valve member, and sealing means for preventing flow of refrigerant around said last named means through said wall.

ALWIN B. NEWTON.